United States Patent [19]
Taylor et al.

[11] Patent Number: 5,552,497
[45] Date of Patent: Sep. 3, 1996

[54] METHOD OF PREPARING CARBAMATE-FUNCTIONAL POLYMER

[75] Inventors: Robert J. Taylor, Northville; John W. Rehfuss, West Bloomfield; Joseph Borst, Plymouth; Paul Lessek, Milford; Donald L. St. Aubin, Commerce Township, all of Mich.

[73] Assignee: BASF Corporation, Southfield, Mich.

[21] Appl. No.: 365,648

[22] Filed: Dec. 29, 1994

[51] Int. Cl.$^6$ .................................... C08F 283/04
[52] U.S. Cl. .................... 525/456; 525/440; 525/452; 525/453; 525/459
[58] Field of Search .................... 525/440, 452, 525/403, 406, 409

[56] References Cited

U.S. PATENT DOCUMENTS

| | | |
|---|---|---|
| 3,674,838 | 7/1972 | Nordstrom . |
| 4,126,747 | 11/1978 | Cowherd, III et al. ................ 520/166 |
| 4,279,833 | 7/1981 | Culberson et al. .................... 560/25 |
| 4,340,497 | 7/1982 | Knopf ........................................ 560/26 |
| 5,098,947 | 3/1992 | Metzger et al. ........................ 524/507 |

FOREIGN PATENT DOCUMENTS

| | | |
|---|---|---|
| 3726956A1 | 2/1989 | Germany . |
| 3811497A1 | 10/1989 | Germany . |
| 3929697A1 | 3/1991 | Germany . |
| 3933890A1 | 4/1991 | Germany . |
| WO94/10211 | 10/1992 | WIPO ............................ C08F 8/30 |
| WO94/10212 | 10/1992 | WIPO ............................ C08F 8/30 |
| WO94/10213 | 10/1992 | WIPO ............................ C08F 8/30 |

*Primary Examiner*—Shelly A. Dodson
*Attorney, Agent, or Firm*—Paul L. Marshall

[57] ABSTRACT

A method of preparing a carbamate-functional acrylic polymer is described, comprising the steps of:

(A) preparing a mixture comprising:
  (1) one or more acrylic monomers comprising hydroxy-functional groups or groups that can be converted to hydroxy functional groups,
  (2) optionally, one or more other addition polymerizable monomers, and
  (3) a carbamate compound, and
(B) heating said mixture in the presence of a free radical initiator and an esterification catalyst, thereby forming a carbamate-functional acrylic polymer.

11 Claims, No Drawings

METHOD OF PREPARING CARBAMATE-FUNCTIONAL POLYMER

FIELD OF THE INVENTION

This invention relates to a method of preparing a carbamate-functional addition polymer.

BACKGROUND OF THE INVENTION

Polymers and oligomers having carbamate functional groups have been used in a variety of curable compositions. Carbamate-functional acrylic polymers [as used herein the terms 'acrylic polymer' and 'acrylic monomer' are defined to include derivatives of both acrylic acid and methacrylic acid] are described, for example, in U.S. Pat. 5,356,669 and WO 94/10211. Carbamate-functional polymers offer many advantages in such compositions, such as resistance to environmental etch, resistance to scratching and marring, and other beneficial physical properties.

Many carbamate-functional polymers described in the art are addition-type polymers. Addition-type polymers are prepared by free radical addition to the double bonds of monomers containing unsaturated sites. Two techniques have been described in the art for preparing carbamate-functional polymers. According to one technique, a monomer is prepared having a carbamate-functional group and polymerized, optionally along with other monomers having groups that are non-reactive with carbamate. Such monomers are well-known in the art and are described, for example in U.S. Pat. Nos. 3,479,328, 3,674,838, 4,126,747, 4,279,833, and 4,340,497, the disclosures of which are incorporated herein by reference.

One method of synthesis of such monomers involves reaction of a hydroxy ester with urea to form the carbamyloxy carboxylate (i.e., carbamate-modified acrylic). Another method of synthesis reacts an a,b-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer is then polymerized along with other ethylenically-unsaturated monomers, if desired, by techniques well-known in the art.

Another route for preparing a carbamate-functional polymer is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing polymers useful as component (a) involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Yet another technique is to transesterify a hydroxy-functional acrylate polymer with a carbamate compound.

Although many of the above-described techniques can be effectively used to prepare carbamate-functional polymers, there are difficulties in applying these techniques. The solubility of carbamate-functional monomers often has poor compatibility with that of many other monomers typically incorporated in addition polymers (e.g., styrene, isobornyl methacrylate, cyclohexyl methacrylate, 2-ethylhexyl acrylate, 2-ethylhexyl methacrylate). This can restrict the level of monomer that can be incorporated in the polymerization mixture and/or the choice of solvent, sometimes to certain polar and/or UV-sensitive solvents that can have adverse effects.

One approach to prepare carbamate-functional polymers without the use of a carbamate-containing monomer has been to transesterify a hydroxy-functional acrylic polymer with a carbamate (e.g., an alkyl carbamate such as methyl carbamate). However, such polymers can exhibit undesired gains in molecular weight. Although an understanding of this molecular weight gain is not needed to characterize the present invention, it is theorized as the result of transesterification of the acrylate ester groups. It would thus be desirable to provide a different method of preparing a carbamate-functional addition polymer than the methods described above.

SUMMARY OF THE INVENTION

Thus, according to the present invention, there is provided a new method of preparing a carbamate-functional acrylic polymer comprising:

(A) preparing a mixture comprising:
   (1) one or more acrylic monomers comprising hydroxy-functional groups or groups that can be converted to hydroxy functional groups,
   (2) optionally, one or more other addition polymerizable monomers, and
   (3) a carbamate compound, and
(B) heating the mixture in the presence of a free radical initiator and an esterification catalyst, thereby forming a carbamate-functional acrylic polymer.

This method avoids many of the solubility compatibility issues related to carbamate-containing monomer compounds and also avoids many of the molecular weight control issues encountered in transesterifying a pre-formed hydroxy-functional acrylic polymer.

DESCRIPTION OF THE PREFERRED EMBODIMENTS

The hydroxy-containing acrylic monomers useful as component (A)(1) can be any of a number of well-known monomers, such as hydroxyethyl acrylate, hydroxyethyl methacrylate, hydroxypropyl acrylate, hydroxypropyl methacrylate, hydroxybutyl acrylate, hydroxybutyl methacrylate, or the reaction product of methacrylic acid with styrene oxide. Useful hydroxy-containing acrylic monomers can be represented by the formula:

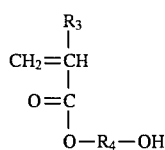

wherein $R_3$ is H or $CH_3$, and $R_4$ is alkyl or aryl of 1–8 carbon atoms and preferably alkyl of 1–4 carbon atoms. Groups that can be converted to hydroxyl groups include acid (e.g., acrylic acid), which can be converted to OH-functional by reaction with itaconic acid. Also, ethylene or propylene oxide groups or cyclic carbonate groups can be converted to OH by known ring-opening reactions.

The polymerization mixture used in the present invention may also optionally comprise (A)(2) one or more other addition-polymerizable monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, and the like; and vinyl monomers such as unsaturated m-tetramethyl xylene isocyanate (sold by American Cyanamid as TMI®), styrenic monomers (e.g., styrene, t-butyl styrene, a-methyl styrene), vinyl toluene and the like. Other examples include methyl (meth)acrylate, ethyl (meth)acrylate, propyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate as well as the corresponding esters of maleic, fumaric, crotonic, isocrotonic, vinylacetic and itaconic acids.

Other ethylenically unsaturated compounds are suitable as the component (A)(2), for example alkoxyethyl acrylates, aryloxyethyl acrylates and the corresponding methacrylates, for example butoxyethyl (meth)acrylate, phenoxyethyl (meth)acrylate; unsaturated carboxylic acids, for example acrylic acid, methacrylic acid, itaconic acid, crotonic acid and half-esters of maleic and fumaric acids as well as their mixtures; unsaturated compounds with tertiary amino groups, for example N,N'-diethylaminoethyl methacrylate, 2-vinylpyridine, 4-vinylpyridine, vinylpyrroldine, vinylquinoline, vinylisoquinoline, N,N'-dimethylaminoethyl vinyl ether and 2-methyl-5-vinylpyridine; compounds such as acrylonitrile, methacrylonitrile, acrolein and methacrolein.

The carbamate compound can be any compound having a carbamate group capable of undergoing a transesterification with the hydroxyl group on component (A)(1). These include, for example, methyl carbamate, butyl carbamate, propyl carbamate, 2-ethylhexyl carbamate, cyclohexyl carbamate, phenyl carbamate, hydroxypropyl carbamate, hydroxyethyl carbamate, and the like. Useful carbamate compounds can be characterized by the formula:

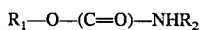

$R_1$ is alkyl (preferably of 1–8 carbon atoms) and $R_2$ is H, alkyl (preferably of 1–8 carbon atoms, cycloalkyl (preferably of 6–10 carbon atoms), or aryl (preferably of 6–10 carbon atoms). It is understood that these groups may be substituted as is known in the art to form, for example, substituted alkyl, substituted cycloalkyl, or substituted aryl. Preferably, $R_2$ is H.

The mixture prepared in step (A) is simultaneously addition polymerized and transesterified by heating in the presence of an addition polymerization initiator and a transesterification catalyst.

Suitable free-radical initiators include organic peroxides, for example dibenzyl peroxide, dicumyl peroxide cumene hydroperoxide, di-tert-butyl peroxide, tert butyl hydro-peroxide, 2,2-di-tert-butylperoxybutane, tert-amyl perbenzoate, 1,3-bis tert-butylperoxyisopropyl)benzene, diisopropylbenzene monohydroperoxide and diacyl peroxides, for example diacetyl peroxide, peroxyketals, for example 2,2-di(tert-amylperoxy)propane and ethyl 3,3-di(tert-amylperoxy)butyrate, thermolabile highly substituted ethane derivatives, for example those based on silyl-substituted ethane derivatives and those based on benzopiracol. Azo compounds, for example azobiscyclohexanenitrile and other compounds sold as Vazo® compounds, may also be used.

The amount of initiator to be used is in the majority of cases 0.1 to 15% by weight, based on the amount of monomers to be processed and the desired molecular weight, but it can be even higher if required. The initiator, dissolved in some of the solvent used for the polymerization, is usually gradually added during the polymerization reaction. If the initiators used decompose only slowly under the prevalent reaction conditions, it is also possible to introduce most or all of the initiator at the outset. However, it is often preferable to add the initiator to the reaction mixture along with the monomer(s) over a period of time, e.g., over ½–6 hours.

The reaction mixture also contains a catalyst for the transesterification reaction of the hydroxy group on the acrylate and the carbamate compound. Such catalysts are known in the art, and are preferably organometallic complexes. Suitable catalysts include tin complexes, such as dibutyltin oxide, dibuyltin dilaurate, dibutyltin diacetate, dibutyltin dimethoxide. Other catalysts, such as aluminum complexes (e.g., aluminum isopropoxide), zinc complexes, titanates, or strong acid catalysts (e.g., dodecylbenzene sulfonic acid) can also be used. The amount of such esterification catalyst can range from 0.05–5%, 5%and preferably from 0.1–1% based on total monomer weight, although this figure can vary depending on the level of carbamate functionality desired. The transesterification catalyst can be added in a single charge at the start of the reaction, but is preferably divided into two portions, one of which is added at the start and the other added after completion of the addition polymerization reaction. Additional carbamate compound may also be added after completion of the addition polymerization reaction.

The reaction may be carried out in the presence of polymerization regulators. Mercapto compounds are preferably used as regulators, mercaptoethanol being particularly preferred. Examples of other possible regulators are alkyl mercaptans, for example tert-dodecyl mercaptan, octyl mercaptan, phenyl mercaptan, octyl-decyl mercaptan, butyl mercaptan, thiocarboxylic acids, for example thioacetic acid or thiolactic acid. These regulators are used in an amount of up to 5% by weight, depending on the amount of monomers to be processed. They are preferably dissolved in one of the monomers feeds and added with the monomers.

The polymerization and the transesterification reaction is preferably carried out in the absence of oxygen, for example by working in a nitrogen atmosphere, although the nitrogen blanket may be removed as the temperature begins to approach reflux (around 100°–130° C.) as long as the nitrogen is resumed once reflux is lost. The reaction vessel is equipped with suitable stirring, heating and cooling equipment as well as with a reflux condenser which condenses volatile constituents, for example solvent and alcohol by-product from the transesterification reaction. A trap or some other device should also be included for removing the alcohol by-product. The polymerization reaction is carried out at temperatures of 100°–140° C., preferably 115°–140° C.

The polymerization and transesterification is carried out in an organic solvent or mixture of organic solvents that is inert toward the monomers used. Examples of suitable solvents include aromatic hydrocarbons, for example toluene, xylene, mesitylene, 2-, 3-, or 4-ethyl toluene, Solvent Naphtha®, heavy naphtha, various types of Solvesso®various types of Shellsol® and Deasol®, as well as higher-boiling aliphatic and cycloaliphatic hydrocarbons, for example various white spirits, mineral terpentine, tetralin and decalin, and also ketones.

According to the practice of the invention, polymers may be prepared having a weight average molecular weight of from 2000 to 40,000. Once the polymerization and transesterification reaction is complete, the polymer reaction mixture can be isolated, reduced, or diluted by techniques well-known in the art.

The polymer prepared according to the invention can be used in a curable coating composition. Such a composition is cured by a reaction of the carbamate-functional polymer with a curing agent that is a compound having a plurality of functional groups that are reactive with the carbamate groups on the polymer. Such reactive groups include active methylol or methylalkoxy groups on aminoplast crosslinking agents or on other compounds such as phenol/formaldehyde adducts, siloxane groups, and anhydride groups. Examples of curing agent compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred.

A solvent may optionally be utilized in a curable coating composition. Although the curable composition may be utilized, for example, in the form of substantially solid powder, or a dispersion, it is often desirable that the composition is in a substantially liquid state, which can be accomplished with the use of a solvent. This solvent should act as a solvent with respect to both the carbamate-functional polymer as well as the curing agent. In general, depending on the solubility characteristics of the components, the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

Curable coating compositions may include a catalyst to enhance the cure reaction. For example, when aminoplast compounds, especially monomeric melamines, are used as the curing agent, a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in curable coating compositions include Lewis acids, zinc salts, and tin salts.

The solvent is present in the coating composition is preferably in an amount of from about 0.01 weight percent to about 99 weight percent, preferably from about 10 weight percent to about 60 weight percent, and more preferably from about 30 weight percent to about 50 weight percent.

Coating compositions can be coated by any of a number of techniques well-known in the art. These include, for example, spray coating, dip coating, roll coating, curtain coating, and the like. For automotive body panels, spray coating is preferred.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

A coating composition utilizing a polymer prepared according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components A and B (i.e., a P:B ratio of 0.1 to 1).

When the coating composition is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C., preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

The invention is further described in the following Example.

Example 1

Carbamate Functional Acrylic

A three-necked 5-liter round bottom flask was fitted with an agitator at the center neck and a Claisson® adapter to one of the side necks. A thermal-couple and a nitrogen purge were fed through the center of the Claisson® adapter and a monomer feed line was fed through the side neck of the adapter. The second side neck of the flask was fitted with a column packed with saddles, a convertible liquid/liquid continuous extractor, and a water cooled condenser. The liquid/liquid extractor contained 100 g of deionized water to extract the methanol from the methanol/aromatic solvent distillate mixture.

862.7 g Urethane-grade mixed aromatics solvent (Solvesso® 100), 418.9 g methyl carbamate, 4.5 g dibutyltin oxide, and 20.0 g methanol were charged to the flask. The mixture was agitated and heated to 130° C. with a nitrogen purge. As distillate started to condense to the liquid/liquid extractor, the nitrogen purge was discontinued.

562.5 g of hydroxyethyl methacrylate, 194.0 g styrene, 155.2 g 2-ethylhexyl methacrylate, 381.4 g 2-ethylhexyl acrylate, 116.4 g Vazo® 67 (2,2'-Azobis (2-Methylbutanenitrile), DuPont), and 93.5 g Solvesso® 100 were charged to a separate container. This mixture was pumped to the reaction flask over a period of 4 hours. At the conclusion of this first feed, a second addition of 19.4 g Vazo® 67 and 112.2 g Solvesso® 100 was fed over 30 minutes. After the second initiator feed, 487.0 g toluene, and 4.5 g dibutyltin oxide were added to the reaction mixture. The reaction mixture was then held for 6 hours, or until the hydroxyl groups were 90–95% consumed as determined by hydroxyl number titration, at 135° C. during which time distillate containing methanol and toluene condensed to the liquid/liquid extractor. The organic layer was allowed to overflow back to the reaction flask. When the aqueous layer containing methanol nearly completely filled the extractor and before any of this layer could overflow to the reaction mixture, the extractor was removed temporarily, emptied, and refilled with another 100 g deionized water during the course of the reaction.

After the reaction was complete, the batch was cooled to 110° C. and the extractor and condenser removed. The batch was then vacuum stripped for 1 hour at 110° C. to remove toluene and residual excess methyl carbamate. After stripping, the carbamate functional acrylic was reduced to 65% solids with a 1/1 mixture of amyl acetate and Ektasolve® EEP solvent (ethoxyethyl propionate, Eastman Chemical), cooled and filtered. A carbamate functional acrylic copolymer resin having a weight average molecular weight of 3615 Daltons, a polydispersity of 1.8, a carbamate equivalent weight of 366 g/eq., and a calculated glass transition temperature of 33° C. was obtained.

The invention has been described in detail with reference to preferred embodiments thereof. It should be understood, however, that variations and modifications can be made within the spirit and scope of the invention.

What is claimed is:

1. A method of preparing a carbamate-functional acrylic polymer comprising the steps of:
   (A) preparing a mixture comprising:
      (1) one or more acrylic monomers comprising hydroxy-functional groups or groups that can be converted to hydroxy functional groups,
      (2) optionally, one or more other addition polymerizable monomers, and
      (3) a carbamate compound, and
   (B) heating said mixture in the presence of a free radical initiator and an esterification catalyst, thereby forming a carbamate-functional acrylic polymer.

2. A method according to claim 1 wherein said carbamate compound is an alkyl carbamate.

3. A method according to claim 1 wherein said carbamate compound is characterized by the formula:

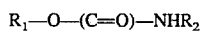

wherein $R_1$ is alkyl of 1–8 carbon atoms, and $R_2$ is H, alkyl of 1–8 carbon atoms, cycloalkyl of 6–10 carbon atoms, or aryl of 6–10 carbon atoms.

4. A method according to claim 3 wherein $R_2$ is H.

5. A method according to claim 1 wherein (A)(1) is a hydroxy-functional acrylic monomer.

6. A method according to claim 1 wherein (A)(1) has the formula:

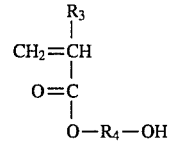

wherein $R_3$ is H or $CH_3$ and $R_4$ is alkyl or aryl of 1–8 carbon atoms.

7. A method according to claim 6 wherein $R_4$ is alkyl of 1–4 carbon atoms.

8. A method according to claim 1 wherein (A)(2) is one or more compounds selected from the group consisting of acrylic acid, methacrylic acid, acrylates, methacrylates, and styrenic monomers.

9. A method according to claim 1 wherein said esterification catalyst is an organometallic complex.

10. A method according to claim 1 wherein said initiator is selected from the group consisting of peroxide or an azo compound.

11. A method according to claim 1 wherein step (B) comprises heating the mixture to a temperature of 100°–140° C.

* * * * *